(12) United States Patent
Mishra et al.

(10) Patent No.: US 11,240,179 B2
(45) Date of Patent: Feb. 1, 2022

(54) INTERNET CLOUD-HOSTED NATURAL LANGUAGE INTERACTIVE MESSAGING SYSTEM WITH VIRTUAL DATABASE

(71) Applicant: Oracle International Corporation, Redwood Shores, CA (US)

(72) Inventors: Shailendra Mishra, Fremont, CA (US); Anand Srinivasan, Bangalore (IN); Sangameswaran Viswanathan, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 355 days.

(21) Appl. No.: 15/661,607

(22) Filed: Jul. 27, 2017

(65) Prior Publication Data

US 2018/0081950 A1    Mar. 22, 2018

(30) Foreign Application Priority Data

Sep. 16, 2016 (IN) .............................. 201641031569

(51) Int. Cl.
*G06F 16/9535* (2019.01)
*H04L 12/58* (2006.01)
(Continued)

(52) U.S. Cl.
CPC ............ *H04L 51/02* (2013.01); *G06F 16/248* (2019.01); *G06F 16/2457* (2019.01);
(Continued)

(58) Field of Classification Search
CPC ... H04L 51/046; H04L 51/18; G06F 16/2282; G06F 16/901; G06F 16/22; G06F 16/27;
(Continued)

(56) References Cited

U.S. PATENT DOCUMENTS

| 7,181,492 B2 | 2/2007 | Wen et al. |
| 7,356,567 B2 | 4/2008 | Odell et al. |

(Continued)

FOREIGN PATENT DOCUMENTS

| CN | 1780412 | 5/2006 |
| CN | 101262494 A | 1/2008 |

(Continued)

OTHER PUBLICATIONS

U.S. Appl. No. 15/661,567, Final Office Action dated May 20, 2019, 16 pages.

(Continued)

*Primary Examiner* — Marcin R Filipczyk
(74) *Attorney, Agent, or Firm* — Kilpatrick Townsend & Stockton LLP

(57) ABSTRACT

Provided are methods, systems, and computer-program products for responding to a natural language communication, sending a response to request additional information from a user, and exposing an invocable method for accessing a virtual database. Some examples relate to a bot server that can respond to natural-language messages (e.g., questions or comments) through a messaging application using natural-language messages. Other examples relate to storage of event data associated with a web page or a mobile application. Event data can describe one or more actions performed in relation to the web page and/or the mobile application. Other examples relate to behavioral analytics of the event data.

17 Claims, 11 Drawing Sheets

(51) Int. Cl.
*G06F 16/951* (2019.01)
*G06F 16/2457* (2019.01)
*G06F 16/2458* (2019.01)
*G06F 16/332* (2019.01)
*G06F 16/27* (2019.01)
*G06F 40/30* (2020.01)
*G06F 40/35* (2020.01)
*G06F 40/295* (2020.01)
*G06F 16/248* (2019.01)
*H04L 29/08* (2006.01)
*G06F 16/33* (2019.01)

(52) U.S. Cl.
CPC ........ *G06F 16/2471* (2019.01); *G06F 16/273* (2019.01); *G06F 16/3329* (2019.01); *G06F 16/951* (2019.01); *G06F 16/9535* (2019.01); *G06F 40/295* (2020.01); *G06F 40/30* (2020.01); *G06F 40/35* (2020.01); *H04L 67/02* (2013.01); *H04L 67/2852* (2013.01); *G06F 16/3344* (2019.01); *H04L 51/04* (2013.01)

(58) Field of Classification Search
CPC .. G06F 16/2358; G06F 16/248; G06F 16/278; G06F 16/9535
See application file for complete search history.

(56) References Cited

U.S. PATENT DOCUMENTS

| | | | |
|---|---|---|---|
| 7,464,141 | B2 | 12/2008 | Morris |
| 7,496,500 | B2 | 2/2009 | Reed et al. |
| 7,503,007 | B2 | 3/2009 | Goodman et al. |
| 7,516,208 | B1 | 4/2009 | Kerrison et al. |
| 7,738,650 | B2 | 6/2010 | Balk et al. |
| 7,895,325 | B2 | 2/2011 | Van Vleet et al. |
| 7,996,855 | B2 | 8/2011 | Heist et al. |
| 8,238,891 | B1 | 8/2012 | Tam et al. |
| 8,583,810 | B2 | 11/2013 | Turk |
| 8,799,000 | B2 | 8/2014 | Guzzoni et al. |
| 8,898,140 | B2 | 11/2014 | Cooper et al. |
| 8,914,446 | B2 | 12/2014 | Braudes |
| 8,943,147 | B2 | 1/2015 | Baartman et al. |
| 8,948,057 | B2 | 2/2015 | Ku et al. |
| 9,196,245 | B2 | 11/2015 | Larcheveque et al. |
| 9,319,243 | B2 | 4/2016 | Stewart |
| 9,361,604 | B2 | 6/2016 | Dhara et al. |
| 9,413,590 | B2 | 8/2016 | Breard et al. |
| 1,123,012 | A1 | 10/2016 | Denninghoff |
| 10,270,864 | B2 | 4/2019 | Sagar et al. |
| 10,491,547 | B2 | 11/2019 | Sagar |
| 10,498,674 | B2 | 12/2019 | Sagar |
| 10,616,147 | B2 | 4/2020 | Viswanathan et al. |
| 10,666,582 | B2 | 5/2020 | Viswanathan et al. |
| 10,848,572 | B2 | 11/2020 | Sagar et al. |
| 2002/0138553 | A1 | 9/2002 | Binder |
| 2002/0152463 | A1 | 10/2002 | Dudkiewicz |
| 2003/0093480 | A1 | 5/2003 | Lagarde et al. |
| 2003/0126063 | A1 | 7/2003 | Reuter et al. |
| 2003/0188037 | A1 | 10/2003 | Elberse |
| 2004/0030750 | A1 | 2/2004 | Moore et al. |
| 2005/0049995 | A1 | 3/2005 | Parkinson |
| 2005/0138132 | A1 | 6/2005 | Zhou et al. |
| 2006/0021004 | A1 | 1/2006 | Moran et al. |
| 2006/0136298 | A1 | 6/2006 | Klein et al. |
| 2007/0174246 | A1 | 7/2007 | Sigurdsson et al. |
| 2007/0192474 | A1 | 8/2007 | Decasper et al. |
| 2008/0046394 | A1 | 2/2008 | Zhou et al. |
| 2008/0147406 | A1 | 6/2008 | Da Palma et al. |
| 2008/0165762 | A1 | 7/2008 | Gilfix et al. |
| 2008/0195712 | A1 | 8/2008 | Lin et al. |
| 2008/0313080 | A1 | 12/2008 | Vasa et al. |
| 2009/0070311 | A1 | 3/2009 | Feng |
| 2009/0234924 | A1 | 9/2009 | Edelen et al. |
| 2010/0004004 | A1 | 1/2010 | Browne-Swinburne et al. |
| 2010/0023506 | A1 | 1/2010 | Sahni et al. |
| 2010/0094655 | A1 | 4/2010 | Kochendorfer et al. |
| 2011/0046960 | A1 | 2/2011 | Spier et al. |
| 2011/0314002 | A1* | 12/2011 | Oliver .................. G06F 16/283 707/722 |
| 2012/0042078 | A1 | 2/2012 | Kroeger et al. |
| 2012/0047217 | A1 | 2/2012 | Hewes et al. |
| 2012/0173566 | A1 | 7/2012 | D'Angelo et al. |
| 2012/0215752 | A1* | 8/2012 | Parkkinen .............. G06F 16/22 707/705 |
| 2012/0265528 | A1 | 10/2012 | Gruber et al. |
| 2012/0296638 | A1 | 11/2012 | Patwa |
| 2012/0310673 | A1 | 12/2012 | Kochendorfer et al. |
| 2013/0103686 | A1 | 4/2013 | Sisneros |
| 2013/0111572 | A1 | 5/2013 | Gaddam et al. |
| 2013/0346513 | A1 | 12/2013 | Jia et al. |
| 2014/0122083 | A1* | 5/2014 | Xiaojiang ............... H04L 51/02 704/270.1 |
| 2014/0122618 | A1 | 5/2014 | Duan |
| 2014/0122619 | A1 | 5/2014 | Duan |
| 2014/0122626 | A1 | 5/2014 | Alam |
| 2014/0136212 | A1 | 5/2014 | Kwon et al. |
| 2014/0222979 | A1 | 8/2014 | St. Clair |
| 2014/0236958 | A1 | 8/2014 | Vaughn |
| 2014/0310001 | A1 | 10/2014 | Kalns et al. |
| 2014/0337381 | A1 | 11/2014 | Aravamudan et al. |
| 2015/0039675 | A1 | 2/2015 | Warren et al. |
| 2015/0066479 | A1 | 3/2015 | Pasupalak et al. |
| 2015/0169385 | A1 | 6/2015 | Allen et al. |
| 2015/0172228 | A1 | 6/2015 | Zalepa et al. |
| 2015/0312176 | A1 | 10/2015 | Jones et al. |
| 2016/0029185 | A1 | 1/2016 | Burke et al. |
| 2016/0063377 | A1 | 3/2016 | Allen et al. |
| 2016/0065519 | A1 | 3/2016 | Waltermann et al. |
| 2016/0086499 | A1 | 3/2016 | Liang et al. |
| 2016/0094490 | A1 | 3/2016 | Li et al. |
| 2016/0179937 | A1 | 6/2016 | Allen et al. |
| 2016/0292276 | A1 | 10/2016 | Denninghoff |
| 2016/0294796 | A1 | 10/2016 | Hidayat et al. |
| 2017/0083507 | A1 | 3/2017 | Ho et al. |
| 2017/0140039 | A1* | 5/2017 | Neels .................. G06F 40/166 |
| 2017/0289070 | A1* | 10/2017 | Plumb .................... H04L 51/16 |
| 2017/0295121 | A1 | 10/2017 | Zhang et al. |
| 2017/0338962 | A1 | 11/2017 | Li et al. |
| 2017/0366480 | A1 | 12/2017 | Sagar |
| 2017/0366481 | A1 | 12/2017 | Sagar |
| 2017/0366621 | A1 | 12/2017 | Sagar et al. |
| 2018/0083892 | A1 | 3/2018 | Viswanathan et al. |
| 2018/0083893 | A1 | 3/2018 | Viswanathan et al. |
| 2018/0302437 | A1 | 10/2018 | Pastore et al. |
| 2019/0052616 | A1 | 2/2019 | Campbell et al. |

FOREIGN PATENT DOCUMENTS

| | | |
|---|---|---|
| CN | 102469042 A | 11/2010 |
| CN | 102752388 A | 6/2012 |
| CN | 102710543 | 10/2012 |
| CN | 103944923 A | 5/2014 |
| CN | 105531979 A | 7/2014 |
| CN | 104735066 A | 3/2015 |
| CN | 104811488 A | 4/2015 |
| EP | 743609 | 11/1996 |
| EP | 2579157 | 4/2013 |
| JP | 07234694 | 9/1995 |
| JP | 2002024212 | 1/2002 |
| JP | 2007219964 | 8/2007 |
| JP | 2007534075 | 11/2007 |
| JP | 2008234427 | 10/2008 |
| JP | 2009003533 | 1/2009 |
| JP | 2010039878 | 2/2010 |
| JP | 2013117938 | 6/2013 |
| JP | 2014216986 | 11/2014 |
| JP | 2016511886 | 4/2016 |
| WO | 2005104433 | 11/2005 |
| WO | 2009092214 | 7/2009 |
| WO | 2014087597 | 6/2014 |
| WO | 2014089539 | 6/2014 |
| WO | 2017222615 | 12/2017 |

(56) References Cited

FOREIGN PATENT DOCUMENTS

| WO | 2017222616 | 12/2017 |
|---|---|---|
| WO | 2017222617 | 12/2017 |
| WO | 2018052542 | 3/2018 |
| WO | 2018052543 | 3/2018 |
| WO | 2018052544 | 3/2018 |

OTHER PUBLICATIONS

U.S. Appl. No. 15/661,567, Non-Final Office Action dated Nov. 19, 2018, 14 pages.
U.S. Appl. No. 15/462,649 received a Notice of Allowance dated Jan. 7, 2019, 15 pages.
U.S. Appl. No. 15/661,516, received a Non-Final Office Action dated Jan. 14, 2019, 19 pages.
U.S. Appl. No. 15/462,729, received a Non-Final Office Action dated Jan. 28, 2019, 37 pages.
International Application No. PCT/US2017/022900, International Preliminary Report on Patentability dated Jan. 3, 2019, 7 pages.
International Application No. PCT/US2017/022919, International Preliminary Report on Patentability dated Jan. 3, 2019, 8 pages.
International Application No. PCT/US2017/022952, International Preliminary Report on Patentability dated Jan. 3, 2019, 9 pages.
International Application No. PCT/US2017/044110, International Preliminary Report on Patentability dated Nov. 28, 2018, 8 pages.
International Application No. PCT/US2017/044114, International Preliminary Report on Patentability dated Nov. 28, 2018, 8 pages.
International Application No. PCT/US2017/044117, International Preliminary Report on Patentability dated Nov. 28, 2018, 7 pages.
Bot Engine, Available online at: https://wit.ai/blog/2016/04/12/bot-engine, Apr. 12, 2016, 3 pages.
Domino's Pizza explains why it is chasing Facebook bots, Available online at: https://www.marketingweek.com/2016/08/17/dominos-pizza-explains-why-it-is-chasing-facebook-bots/, Aug. 17, 2016.
Fugu Chatbots, Available online at: http://click-labs.com/launching-fugu-user-insights-marketing-automation-bot-apps-2/, May 9, 2016.
How To Build Bots for Messenger—Facebook, Available online at: https://developers.facebook.com /blog/post/ 2016/04/12/bots-for-messenger/, 2016.
How to deploy a Facebook bot, Available online at: https://medium.com/@igougi.ui/how-to-deploy-a-facebook-bot-2b8c4f4e7eae#.bgzbrzwnz, retrieved on Nov. 21, 2016.
Technical Issues Of Establishing Any-To-Any 2-Way Real-Time Communications Over The Internet, Jul. 2004, 19 pages.
Edwards, Session Management for Collaborative Applications, Available online at: http://www.cc.gatech. edu/home/keith/pubs/session-mgmt.pdf, 1994, 8 pages.
Fitz, What webhooks are and why you should care, Available online at: http://timothyfitz.com/2009/02/09/what-webhooks-are-and-why-you-should-care/, Feb. 9, 2009, 3 pages.
Quarteroni, Advanced Techniques For Personalized, Interactive Question Answering, Available online at: https://www.cs.york.ac.uk/ftpdir/reports/2007/YCST/18/YCST-2007-18.pdf, 2007, 239 pages.
International Application No. PCT/US2017/022900, International Search Report and Written Opinion dated Jun. 26, 2017, 10 pages.
International Application No. PCT/US2017/022919, International Search Report and Written Opinion dated Jun. 27, 2017, 11 pages.
International Application No. PCT/US2017/022952, International Search Report and Written Opinion dated May 31, 2017, 13 pages.
International Application No. PCT/US2017/044110, Written Opinion dated Jul. 20, 2018, 7 pages.
International Application No. PCT/US2017/044117, Written Opinion dated Jul. 20, 2018, 6 pages.
International Application No. PCT/US2017/044114, Written Opinion dated Aug. 7, 2018, 7 pages.
International Application No. PCT/US2017/044110, International Search Report and Written Opinion dated Nov. 8, 2017, 13 pages.
International Application No. PCT/US2017/044114, International Search Report and Written Opinion dated Nov. 8, 2017, 13 pages.
International Application No. PCT/US2017/044117, "International Search Report and Written Opinion" dated Dec. 11, 2017, 11 pages.
U.S. Appl. No. 15/462,729, Notice of Allowance dated Jul. 25, 2019, 9 pages.
U.S. Appl. No. 15/462,737, Notice of Allowance dated Jul. 29, 2019, 7 pages.
U.S. Appl. No. 15/661,516, Final Office Action dated Jul. 29, 2019, 22 pages.
U.S. Appl. No. 15/661,567, Advisory Action dated Aug. 2, 2019, 2 pages.
U.S. Appl. No. 15/462,737, Non-Final Office Action dated Mar. 8, 2019, 11 pages.
U.S. Appl. No. 15/462,737, Final Office Action dated Jun. 27, 2019, 6 pages.
U.S. Appl. No. 15/661,567, Notice of Allowance dated Sep. 23, 2019, 7 pages.
U.S. Appl. No. 15/661,567, Notice of Allowance dated Nov. 15, 2019, 8 pages.
U.S. Appl. No. 15/661,607, Non-Final Office Action dated Sep. 25, 2019, 9 pages.
U.S. Appl. No. 15/661,516 received a Non-Final Office Action dated Dec. 10, 2019, 20 pages.
European Application No. 17715306.1, Office Action dated Mar. 30, 2020, 5 pages.
European Application No. 17715307.9, Office Action dated Mar. 30, 2020, 5 pages.
European Application No. 17717538.7, Office Action dated Mar. 27, 2020, 4 pages.
U.S. Appl. No. 16/284,135, Non-Final Office Action dated Jun. 9, 2020, 13 pages.
Chinese Application No. CN201780028692.2 received an Office Action dated Nov. 23, 2020, 16 pages (7 pages of Original Document and 9 pages of English Translation).
Chinese Application No. CN201780028696.0 received an Office Action dated Nov. 24, 2020, 13 pages (5 pages of Original Document and 8 pages of English Translation).
Chinese Application No. CN201780029486.3 received an Office Action dated Nov. 5, 2020, 23 pages (11 pages of Original Document and 12 pages of English Translation).
European Application No. 17 717 538.7-1216 received a Communication under rule 71(3) EPC dated Dec. 4, 2020, 73 pages.
U.S. Appl. No. 16/284,135, Notice of Allowance dated Sep. 28, 2020, 9 pages.
Chinese Application No. CN201780054868.1, Office Action dated Aug. 4, 2020, 13 pages (6 pages of Original Document and 7 pages of English Translation).
The Business Strategy for Financial Services of NTT Data, Business communication, 2006, 7 pages, (2 pages of Original Document and 5 pages of English Translation).
Chinese Application No. 201780029486.3, Office Action dated Jun. 2, 2021, 7 pages (3 pages of Original Document and 4 pages of English Translation).
Kaichi et al., Recommendation System of Tourist Spots Using Distributed Representation of Words, The Institute of Electronics Information and Communication Engineers, IEICE Technical Report LOIS2015-71 (Mar. 2016), 2016 (6 pages of Original Document and 15 pages of English Translation).
Indian Application No. 201947004596, First Examination Report dated Jun. 17, 2021, 7 pages.
Japanese Application No. 2019-514745, Notice of Decision to Grant dated Jun. 22, 2021, 5 pages (3 pages of Original Document and 2 pages of English Translation).
Japanese Application No. 2019-514756, Office Action dated Jun. 1, 2021, 4 pages (3 pages of Original Document and 1 page of English Translation).
Chinese Application No. 201780054868.1, Notice of Decision to Grant dated Jan. 13, 2021, 2 pages, no English Translation Available.
Chinese Application No. CN201780028692.2, Notice of Decision to Grant dated Apr. 21, 2021, 2 pages, no English Translation Available.
Chinese Application No. CN201780028696.0, Notice of Decision to Grant dated Apr. 22, 2021, 2 pages, no English Translation Available.

(56) References Cited

OTHER PUBLICATIONS

European Application No. 17717538.7, Notice of Decision to Grant dated Apr. 9, 2021, 2 pages.
Japanese Application No. 2018-562347, Office Action dated Feb. 2, 2021, 4 pages, List of References cited 1 page, 3 pages Original Office Action, no English Translation Available.
Japanese Application No. 2018-562350, Office Action dated Apr. 6, 2021, 3 pages, List of References cited 1 page, 2 pages Original Office Action, no English Translation Available.
Japanese Application No. 2018-562354, Office Action dated Apr. 6, 2021, 4 pages, List of References cited 1 page, 3 pages Original Office Action, no English Translation Available.
Japanese Application No. 2019-514747, Notice of Decision to Grant dated Apr. 13, 2021, 3 pages, no English Translation Available.
Indian Application No. 201847034957, First Examination Report dated May 3, 2021, 6 pages.

* cited by examiner

500

RECEIVING, BY A BOT SERVER ASSOCIATED WITH A UNIFORM RESOURCE IDENTIFIER (URI), A HYPERTEXT TRANSFER PROTOCOL (HTTP) POST CALL MESSAGE
510

↓

IDENTIFYING AN INTENT OF THE USER TEXT
520

↓

IDENTIFYING ONE OR MORE REQUIRES ENTITIES ASSOCIATED WITH THE IDENTIFIED INTENT
530

↓

IDENTIFYING A REQUIRED ENTITY OF THE ONE OR MORE REQUIRED ENTITIES THAT IS MISSING FROM THE USER TEXT
540

↓

GENERATING A RESPONSE FOR THE HTTP POST CALL MESSAGE
550

↓

SENDING THE RESPONSE FOR THE HTTP POST CALL MESSAGE TO THE MESSAGING APPLICATION SERVER
560

FIG. 5

INTERNET CLOUD-HOSTED NATURAL LANGUAGE INTERACTIVE MESSAGING SYSTEM WITH VIRTUAL DATABASE

CROSS-REFERENCES TO RELATED APPLICATIONS

The present application claims the benefit and priority to Indian Provisional Patent Number 201641/031569, filed on Sep. 16, 2016, entitled "INTERNET CLOUD-HOSTED NATURAL LANGUAGE INTERACTIVE MESSAGING SYSTEM," the entire contents of which is hereby incorporated by reference for all purposes.

BACKGROUND

Messaging applications (e.g., FACEBOOK® Messenger, WHATSAPP® instant messaging software, WECHAT® mobile text and voice messaging communication service, KIK® Messenger, TELEGRAM® Messenger, and SKYPE MOBILE® messenger) are a fast emerging technology on internet-connected devices, such as mobile devices, laptops, and tablets. The messaging applications have obtained high penetration and daily usage numbers. However, enterprise applications on mobile devices are struggling to get users to download and use the enterprise applications regularly.

SUMMARY

The present disclosure describes techniques for exposing a virtual database for atomic data from at least one or more of a mobile application and a web server. The virtual database can be used for behavioral analytics of mobile applications and web sites. In some examples, the behavioral analytics can be for one or more interactions with a mobile application and/or a web site, including engagement (e.g., an activity level of a user), cohort analysis (e.g., retention of a user), churn prediction (e.g., identifying users that are at risk of not returning), user/session analytics (e.g., identifying information associated with a session for a user), and predictive analytics (e.g., based on a sample, identifying an inference that can be associated with all of the data).

For example, a method can include receiving, by a storage server, event data associated with a source. In some examples, the source can be a mobile application or a web page. In such examples, the event data can describe one or more actions related to the source.

The method can further include storing the event data in a location in a local database when the event data is received by the storage server. In some examples, the storage server can include the local database. In such examples, data in the location is deleted according to a first schedule. An example of the first schedule can be daily.

The method can further include storing the event data in a remote database according to a second schedule. The event data can be stored in the remote database after the event data is stored in the local database. In some examples, the remote database can be separate from the storage server. In such examples, the second schedule can be less often than the first schedule. An example of the second schedule can be hourly. In some examples, a remote file system can include the remote database.

The method can further include exposing, to a client application, a first invocable method for querying a virtual database. In some examples, a query for the event data using the first invocable method can retrieve the event data from the local database when the event data is in the local database. In such examples, the query can retrieve the event data from the remote database after the event data is deleted from the local database.

The method can further include calculating a summary calculation based on the event data. The summary calculation can be calculated by the storage server based on data included on the storage server. In some examples, the summary calculation can be incrementally updated when event data is received by the storage server. The summary calculation can be incrementally updated without having to query a database for event data. In other examples, the summary calculation can be incrementally updated according to a third schedule. For example, the third schedule can be hourly. The summary calculation can be based on data that is currently stored in the local database and data that is currently stored in the remote database. The summary calculation can be based on data from a period of time prior to the current time. The method can further include exposing, to the client application, a second invocable method for accessing the summary calculation.

In some examples, the summary calculation can be a materialized view of analytics associated with an application or a web page. In such examples, the summary calculation can include one or more calculations associated with the event data. As new interactions occur on the application or the web page, the one or more calculations can be incrementally updated rather than having to query the event data to perform the one or more calculations. For example, a calculation can be for a number of daily users. In such an example, a number can be stored for the number of daily users. As new users interact with the application or the web page, the number can be incremented rather than having a system count the number of users each time a request is made for the number of daily users.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative examples are described in detail below with reference to the following figures:

FIG. 5 is a flowchart illustrating an example of a process for sending a response to request additional information from a user;

DETAILED DESCRIPTION

Figure 1:
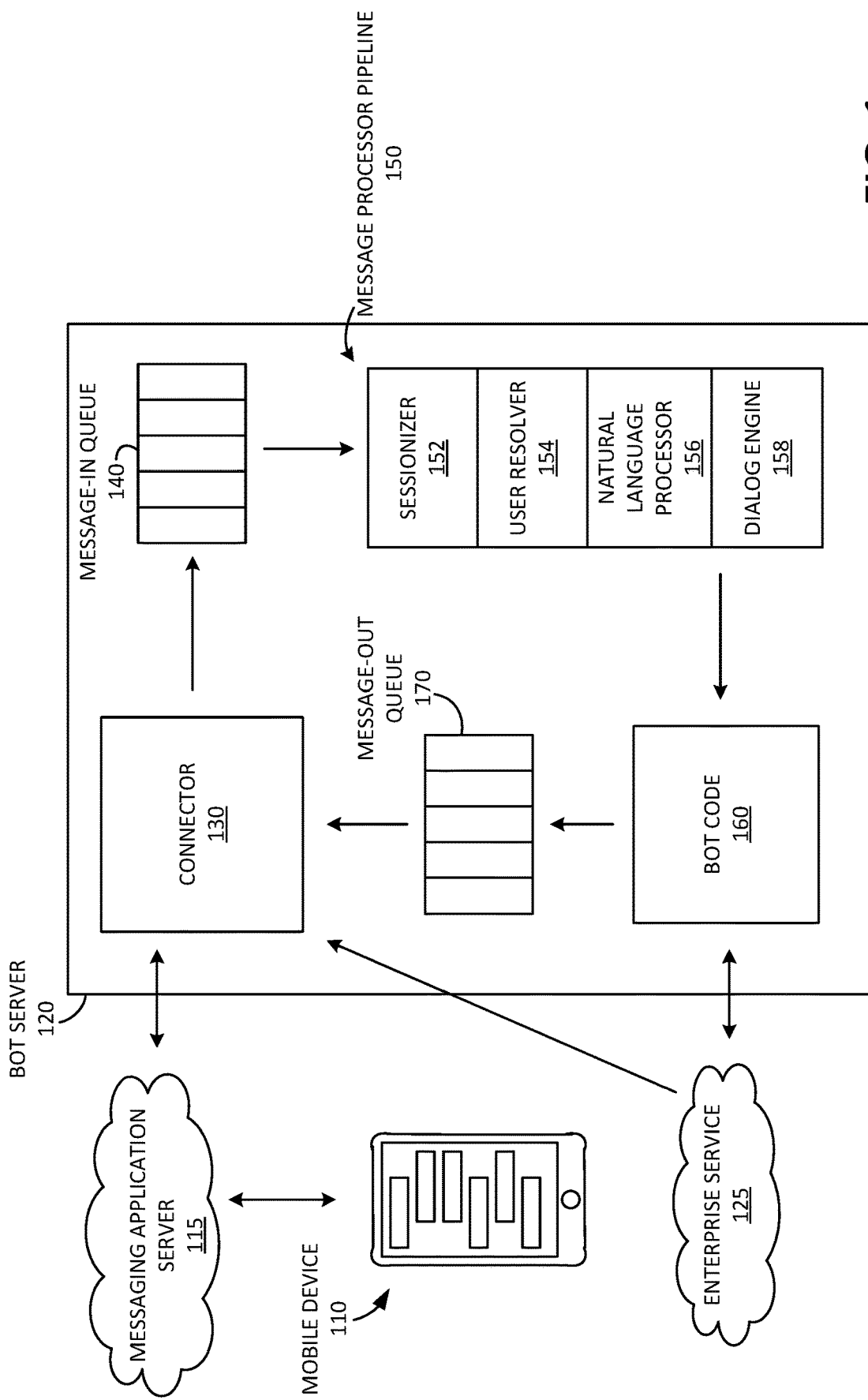
FIG. 1 illustrates an example of a system that implements a bot server for communicating with a user using a messaging application.

In the following description, for the purposes of explanation, specific details are set forth in order to provide a thorough understanding of examples of this disclosure. However, it will be apparent that various examples may be practiced without these specific details. The figures and description are not intended to be restrictive.

The ensuing description provides exemplary examples only, and is not intended to limit the scope, applicability, or configuration of the disclosure. Rather, the ensuing description of the exemplary examples will provide those skilled in the art with an enabling description for implementing an exemplary example. It should be understood that various changes may be made in the function and arrangement of elements without departing from the spirit and scope of this disclosure as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

A. Overview

Examples herein relate to a bot server that can respond to natural-language messages (e.g., questions or comments) through a messaging application using natural-language messages. In particular, examples can allow enterprises to define one or more bot servers that communicate with users and run the one or more bot servers at scale in a multi-tenant, cross-messaging platform manner.

In some examples, a bot server can be associated with a Uniform Resource Identifier (URI). The URI can identify the bot server using a string of characters. The URI can be used as a webhook for one or more messaging application servers. Forms of the URI can include a Uniform Resource Locator (URL) and Uniform Resource Name (URN). The bot server can be designed to receive a message (e.g., a hypertext transfer protocol (HTTP) post call message) from a messaging application server. The HTTP post call message can be directed to the URI from the messaging application server. In some examples, the message can be different from a HTTP post call message. For example, the bot server can receive a message from a Short Message Server (SMS). While discussion herein will refer to communications that the bot server receives as a message, a person of ordinary skill in the art will recognize that the message can be an HTTP post call message, a SMS message, or any other type of communication between two systems. In addition, anytime a bot server sends a message from one component to another, a person of ordinary skill in the art will recognize that the actual message might not be sent. Instead, information from the message can be sent.

In some examples, the bot server can handle user interactions without interaction by an administrator of the bot server. For example, a user can send one or more messages to the bot server in order to achieve a desired goal (sometimes referred to as an intent). A message can include content (e.g., text, emojis, audio, image, video, or other method of conveying a message). The bot server can convert the content into a standardized form (e.g., a REST call against the enterprise services with the proper parameters) and generate a natural language response. The bot server can also prompt the user for additional required parameters and request additional information. The bot server can also initiate communication to the user.

FIG. 1 illustrates an example of a system that implements a bot server 120 for communicating with a user using a messaging application. In some examples, the messaging application can be installed on an electronic device (e.g., a desktop computer, a laptop, a mobile device 110, or the like). While the discussion herein will reference a mobile device and a messaging application, a person of ordinary skill in the art will recognize that any electronic device can be used and any messaging platform can be used (e.g., FACEBOOK® Messenger, WHATSAPP® instant messaging software, WECHAT® mobile text and voice messaging communication service, KIK® Messenger, TELEGRAM® Messenger, SKYPE MOBILE® messenger, Short Message Service (SMS)). In other examples, the messaging application can be run through a browser (e.g., GOOGLE CHROME® browser, MOZILLA® FIREFOX® browser, and INTERNET EXPLORER browser) that is installed on the mobile device 110. The messaging application can be FACEBOOK® Messenger, WHATSAPP® instant messaging software, WECHAT® mobile text and voice messaging communication service, KIK® Messenger, TELEGRAM® Messenger, SKYPE MOBILE® messenger, or any other messaging application that provides a platform for users to communicate. The messaging application can be associated with a messaging application server 115. The mobile device 110 can be connected to the messaging application server 115 by a first network (e.g., Internet). The messaging application server 115 can manage content sent and received through the messaging application across multiple mobile devices. The content can include text, emojis, audio, media (e.g., a picture, a video, a link), or other method of conveying a message. An example of a message received by the bot server 120 from FACEBOOK® Messenger can be:

```
{
    "channel": {
        "tenant_id": "DemoTenant",
        "client_data": {
            "channel_user_id": "1103645260000000",
            "type": "facebook",
            "chat_id": "1103645260000000"
        },
        "type": "facebook",
        "bot_id": "DemoBot",
        "client_id": "facebook"
    },
    "id": "411fc848-350b-47de-89c3-a0ecee314401",
    "text": "Can I have a cheese pizza?",
    "type": "text"
}
```

The messaging application server 115 can also communicate with the bot server 120. The communication between the messaging application server 115 and the bot server 120 can be on a second network (e.g., Internet). The first network and the second network can be the same network, or they can be similar or completely different networks. The messaging application server 115 can route content (e.g., a message or information from a message) from the mobile device 110 to the bot server 120 using the Internet. The destination of the content (e.g., an identification of the bot server 120) can be included in the content as a nominal addressee.

The bot server 120 can receive the content using a connector 130. The connector 130 can act as an interface between the messaging application server 115 and the bot server 120. In some examples, the connector 130 can normalize content from the messaging application server 115 such that the bot server 120 can analyze content across different messaging application servers. Normalizing can include formatting content from each type of messaging application to a common format for processing. In some examples, the bot server 120 can include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE® messenger, a Short Message Service (SMS)).

The connector 130 can route the content to a message-in queue 140. The message-in queue 140 can store content in an order received. In some examples, the connector 130 can be associated with one or more message-in queues.

The message-in queue 140 can send the content to a message processor pipeline 150 when the message processor pipeline 150 becomes available. In other examples, the message processor pipeline 150 can pull the content from the message-in queue. The message processor pipeline 150 can analyze the content using one or more of the innovations described herein. For example, the message processor pipeline 150 can include at least one or more of a sessionizer 152, a user resolver 154, a natural language processor 156, a dialog engine 158, or any combination thereof. Generally, the sessionizer 152 can create and manage sessions for users and bot servers. Generally, the user resolver 154 can determine sessions that can be combined because of an overlapping user using multiple messaging applications. Generally, the natural language processor 156 can parse a message to determine an intent for the message. The intent can include a purpose of the message. For example, a purpose of the message can be to order a pizza, order a computer, ask a question regarding delivery, etc. Generally, the dialog engine can orchestrate a conversation with the bot server.

After the content is analyzed by the message processor pipeline 150, the analyzed content can be sent to bot code 160. The bot code 160 can be written by a third party to determine an action to perform based on the analyzed content and a session. In some examples, the session can include an intent of the message. The bot code 160 can send outbound content to a message-out queue 170. The message-out queue 170 can send the outbound content to the connector 130. The connector 130 can then send the outbound content to a messaging application server indicated by the bot code 160, which can be the same as or different from the messaging application server 115. The messaging application server 115 can then forward the outbound content to the messaging application on the mobile device 110.

The bot server 120 can further communicate with one or more enterprise services (e.g., enterprise service 125), a storage server for storing and possibly analyzing messages receives by the bot server 120 (as described in FIG. 6), or a content server for providing content to the bot server 120. The enterprise service 125 can communicate with at least one or more of the connector 130, the bot code 160, or any combination thereof. The enterprise service 125 can communicate with the connector 130 in a similar manner to the messaging application server 115. The enterprise service 125 can send content to the connector 130 to be associated with one or more users. The enterprise service 125 can also send content to the connector 130 to cause the bot server 120 to perform an action associated with a user. The bot code 160 can communicate with the enterprise service 125 to obtain information from the enterprise service 125 and/or for the enterprise service 125 to take an action identified by the bot code 160.

In some examples, the bot server 120 can include one or more timers. A timer can cause the bot code 160 to send content to a user using the connector 130 and the messaging application server 115 after an amount of time lapses. In some examples, a timer can send content to the bot server 120 similar to a user or an enterprise service 125. For example, the timer can send a message to the bot server 120 to be analyzed as a message from a user would be analyzed.

To illustrate the bot server 120, an example will now be described. A user can send a message to a bot server using a messaging application. The message can include a greeting. The bot server can identify that a new conversation has begun with the user. The bot server can identify one or more characteristics of the user. For example, the bot server can identify a name of the user using a profile associated with the user on the messaging application server. Using the one or more characteristics, the bot server can respond to the user on the messaging application. The response can include a message to the user that responds to the message received from the user. For example, the response can include a greeting using the name of the user.

Depending on an enterprise associated with the bot server, the bot server can progress to accomplish a goal of the enterprise. For example, if the bot server is associated with a pizza delivery enterprise, the bot server can send a message to the user asking if the user would like pizza. The conversation between the bot server and the user can continue from there, going back and forth, until the bot server has completed the conversation or the user stops responding to the bot server.

In some examples, the bot server can initiate a conversation with a user. The server-initiated conversation can be in response to a previous conversation with the user. For example, the user can order a pizza in the previous conversation. The bot server can then initiate a conversation when the pizza is ready. In some examples, the bot server can determine the pizza is ready when an indication is received from the enterprise associated with the bot server (e.g., an employee sending a message to the bot server that the pizza is ready). The conversation can include a message sent to the user that indicates that the pizza is ready.

In some examples, the bot server can send a message to the user on a different messaging application than the messaging application that a previous message was received. For example, the bot server can determine to send the message using Short Message Service (SMS) rather than FACEBOOK® Messenger. In such implementations, the bot server can integrate multiple messaging applications.

In some examples, the bot server can determine to start a conversation based on a timer. For example, the bot server can determine to have a one-week-timer for a user after a pizza is ordered. Expiration of the one-week timer can cause the bot server to start a new conversation with the user for ordering another pizza. The timer can be configured by the enterprise and implemented by the bot server.

In some examples, the bot server can maintain information between conversations. The information can be used so that the bot server does not need to ask some questions every time a new conversation is started between the user and the bot server. For example, the bot server can store a previous order of pizza by the user. In a new conversation, the bot server can send a message to the user that asks if the user wants the same order as last time.

The bot server 120 can allow each component to be scaled when slowdowns are identified. For example, if the bot server 120 identifies that a number of messages are arriving at the connector 130 that exceed a threshold, an additional one or more connectors can be added to the connector 130. In addition, a number of each of message-in queues, message processor pipelines, instances of bot codes, and message-out queues can be increased depending on where a slowdown is identified. In such implementations, additional components can be added without having to add other additional components. For example, a connector can be added without having to add an additional instance of the bot code. In some implementations, one or more components, or a portion of a component, of the bot server 120 can be run on a virtual machine. By running on a virtual machine, additional virtual machines can be initiated at will.

In some examples, the bot server 120 can store information associated with users in a cache. The cache can write to a database to save the information after an outbound message is sent to the messaging application server from the connector 130. In other examples, the cache can write to the data at different times (e.g., after a particular component, after each component, after an amount of time, or any other metric to determine when to write to the database).

B. Natural Language Processor

As described above, a message processor pipeline can include a natural language processor. The natural language processor can determine an intent for messages being processed by the natural language processor. In some examples, an intent can be a goal, a reason, or a purpose for a message sent by a user. For example, a user can send a message to a pizza application with the intent to (1) order a pizza, (2) cancel an order, or (3) check on a status of an order.

In some examples, the intent for a message can be determined using vectors. A vector can be a distributed representation of content (e.g., text, audio, media, or the like). The vector can include a plurality of elements, each element characterizing the text according to a model (e.g., a language model). A language model can be a function, or an algorithm for learning such a function, that captures the salient statistical characteristics of a distribution of sequences of words in a natural language. In some examples, elements of the vector can represent semantic/syntactic information that is chosen and determined by the language model. In some examples, the vector can be in a continuous vector space, defined by the language model, where semantically similar texts can be mapped to nearby points. A person of ordinary skill in the art will recognize there are many ways to train the language model to generate the vector for the text. For example, a predictive method (e.g., neural probabilistic language model) can be used to train the language model. See Distributed representations of sentences and documents—Le & Mikolov, ICML 2014, which is incorporated in its entirety herein.

In some examples, a first vector can be generated for a message being processed by the natural language processor. The message can include content (e.g., text, audio, media, or the like). The first vector can be compared to one or more second vectors. In some examples, both the first vector and the one or more second vectors can be generated based on the language model. Each second vector can be associated with an intent, which can be defined by one or more examples. An example can be content that has been identified as being associated with the intent. In some examples, a user can identify that the example is associated with the intent. In other examples, intents can be determined using a predictive method, as described above to train the language model. In such examples, once intents are determined using the predictive method, a user can associate the determined intents with bot code such that the bot server can know how to have a conversation for the determined intents.

When comparing vectors, the first vector can be determined to be associated with an intent when a distance (e.g., cosine distance or Euclidian distance) between the first vector and a second vector (associated with the intent) is less than a predetermined threshold. The cosine similarity between two vectors can be a measure that calculates the cosine of an angle between the two vectors.

In some examples, one or more entities can be defined for one or more intents. In such examples, the one or more entities can be defined by a user. In other examples, the one or more entities can be defined by the language model. For example, when a particular phrase (e.g., one or more words) is often used in a conversation, the particular phrase can be identified as an entity. For another example, when particular content is often used to reflect an intent, the particular content can be identified as an entity.

When intents include one or more entities, the natural language processor 156 can further identify an entity in a message. In such examples, the entity can be used in addition to the comparison described above. For example, after a comparison is made between intents, two or more intents can be similar. In such an example, an intent of the two or more intents that includes the most entities that have been identified in the message can be selected as the intent of the message. In some examples, particular entities are identified as more important than other entities. In such examples, intent selection can take into account weights assigned to each entity when determining the intent of the message.

In some examples, the natural language processor 156 can import and/or export a knowledge pack. A knowledge pack can include one or more intents for one or more industries, one or more domains, or other logical grouping of one or more intents. An intent of the one or more intents can include one or more examples, one or more entities, and/or a vector for the intent. In some examples, a knowledge pack can be updated based on new messages received. In some examples, a knowledge pack can be maintained across bot servers, where updates from one bot server to the knowledge pack affects the knowledge pack for other bot servers.

Figure 2:
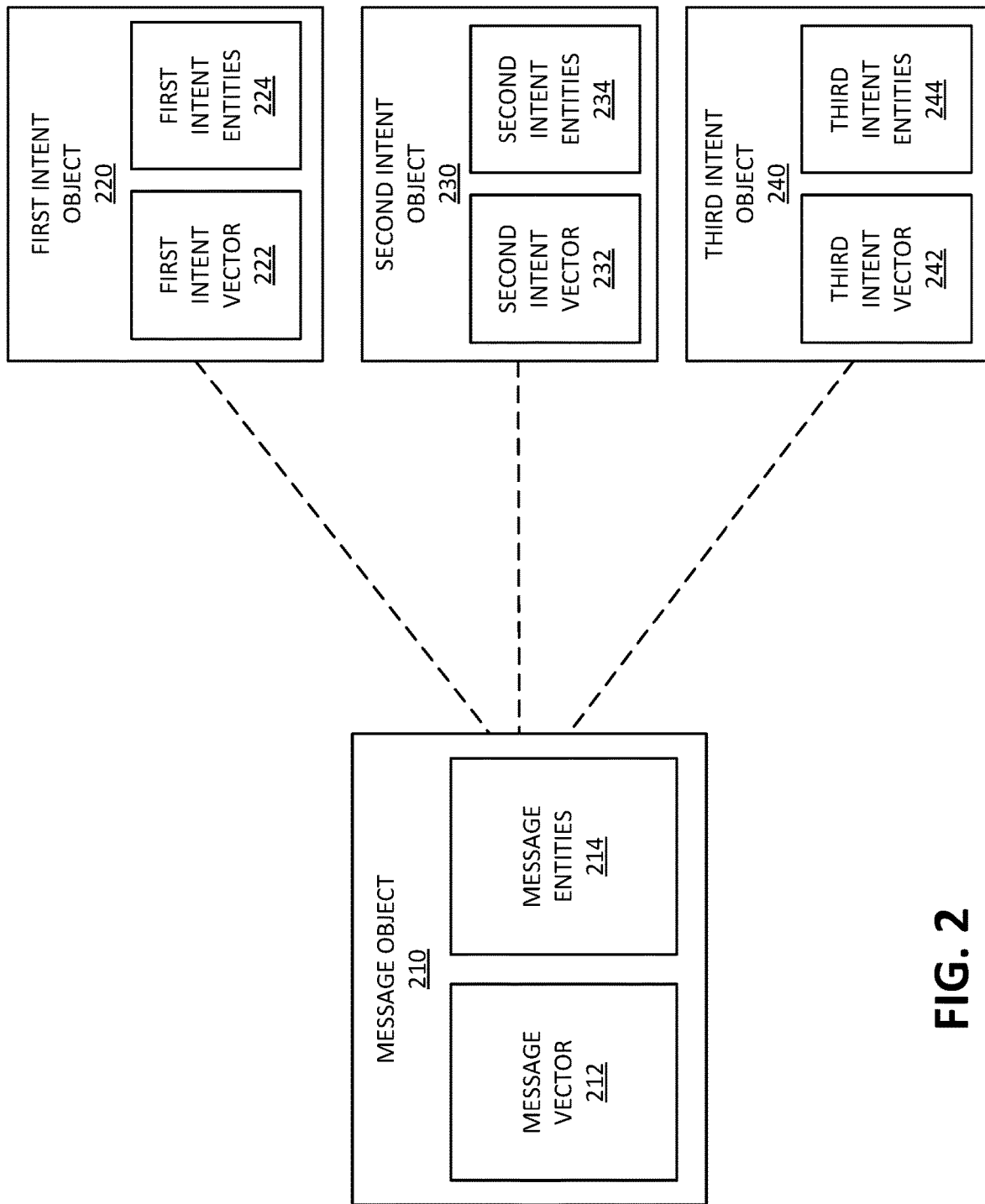
FIG. 2 illustrates an example of system for identifying an intent of a message using a natural language processor.

FIG. 2 illustrates an example of a system for identifying an intent of a message using a natural language processor. The message can be received from a user. The message can include one or more words. In some examples, the message can be stored as a message object 210. However, a person of ordinary skill in the art will realize that the message can be stored in other ways or other data structures. For example, because the one or more words are not needed for the natural language processing, the message object 210 might not include the one or more words.

The message object 210 can include a message vector 212 and a list of entities included in the message (e.g., message entities 214). The message vector 212 can be generated for the message using the one or more words and a language model as described above. The message vector 212 can be a distributed representation of the one or more words.

An intent object (e.g., first intent object 220, second intent object 230, and third intent object 240) can be associated with an intent, as described above. An intent object can include an intent vector (e.g., first intent vector 222, second intent vector 232, and third intent vector 242). The intent vector can be a distributed representation of one or more words identified as being associated with an intent associated with the intent vector. An intent object can further include a list of one or more entities associated with the intent (e.g., intent entities). Each of the intent entities can be compared with the one or more words of the message to populate the message entities 214.

In some examples, the message vector 212 can be compared to each of the first intent object 220, the second intent object 230, and the third intent object 240. In such examples, the comparison can be performed by computing a distance (e.g., cosine distance or Euclidian distance) between the vectors. If a computed distance for an intent object is below a threshold, an intent associated with the intent object can be determined to be associated with the message.

In some examples, if more than one computed distance is below the threshold, an intent associated with the lowest computed distance for an intent object can be determined to be associated with the message. In other examples, if more than one computed distance is below the threshold, the message entities 214 can be used. For example, an intent object with the most entities in the message entities 214 can be determined to be the most likely intent. In such an example, an intent associated with the intent object with the most entities can be determined to be associated with the message. In some examples, the message object 210 might not include the message entities 214. In such examples, entities in the message can be identified when more than one computed distance is below the threshold.

Figure 3:
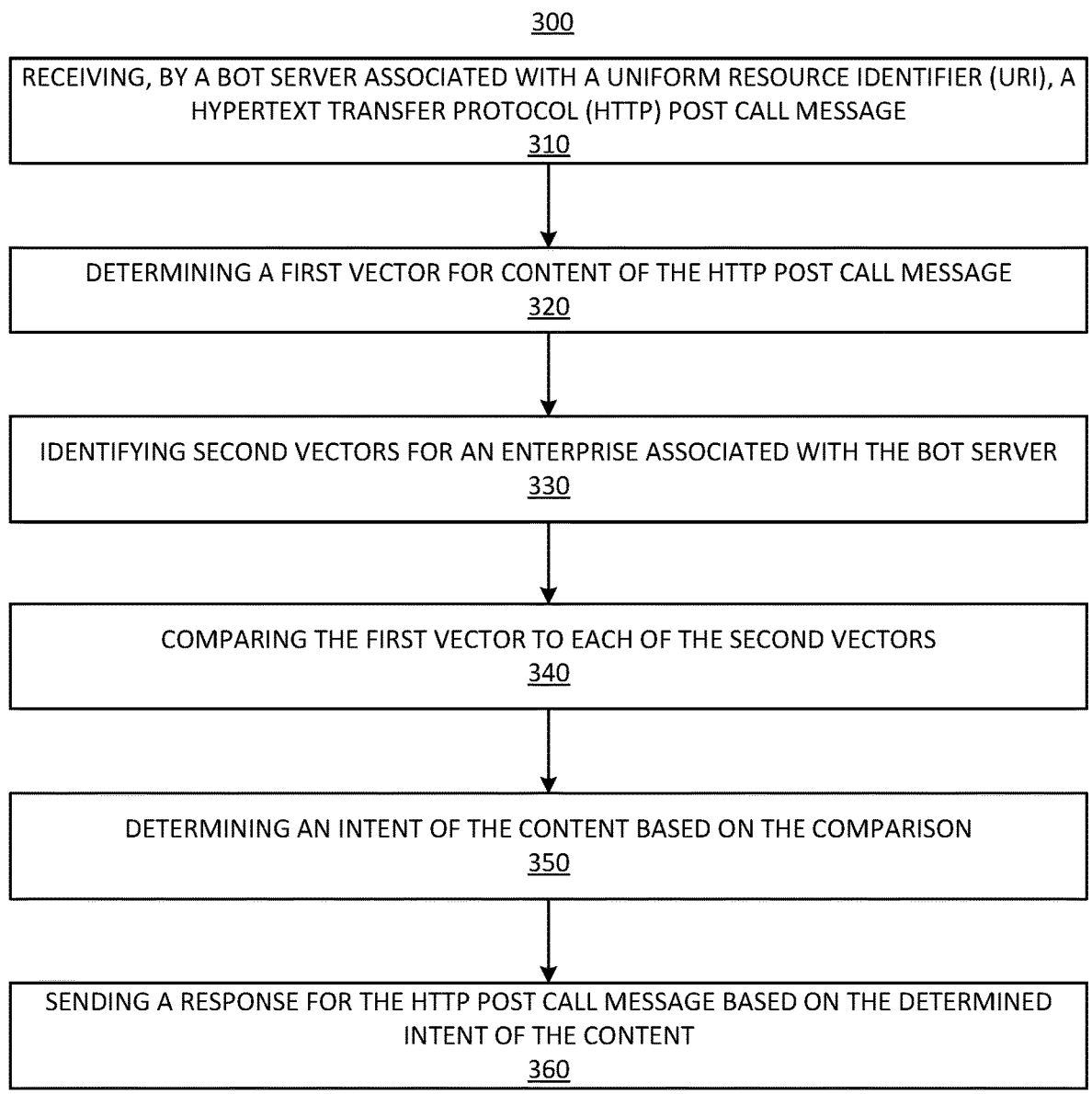
FIG. 3 is a flowchart illustrating an example of a process for responding to a natural language communication.

FIG. 3 is a flowchart illustrating an example of a process 300 for responding to a natural language communication. In some aspects, the process 300 can be performed by a bot server that includes a natural language processor. While specific examples might be given of the bot server, it should be recognized that other devices can be included in the process 300.

Process 300 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 310, the process 300 includes receiving, by a bot server with a uniform resource identifier (URI), a hypertext transfer protocol (HTTP) post call message. The bot server can be associated with an enterprise. In some examples, the HTTP post call message can be directed to the URI from a messaging application server. In such examples, the HTTP post call message can include content from a user. In other examples, the content can be received by the bot server in a message other than a HTTP post call message (e.g., a packet sent from a remote server). In some examples, the content can include one or more words.

At step 320, the process 300 further includes determining a first vector for the content. In some examples, the first vector can be a distributed representation of the content. In such examples, the first vector can include first elements, each first element of the first elements characterizing the content according to a language model. In some examples, each element of the first elements might not be mutually exclusive.

At step 330, the process 300 further includes identifying second vectors for the enterprise associated with the bot server. In some examples, a second vector of the second vectors can be associated with an intent. In such examples, the intent can be defined by one or more examples, each example being one or more words that is indicated as being relevant to the intent. In some examples, the second vector can be a distributed representation of the one or more examples. In such examples, the second vector can include second elements, each second element of the second elements characterizing the one or more examples according to the language model. In some examples, each element of the second elements might not be mutually exclusive.

At step 340, the process 300 further includes comparing the first vector to each of the second vectors. In some examples, comparing can include computing a distance (e.g., cosine distance or Euclidian distance) between the first vector and each of the second vectors. In some examples, the process 300 can further include identifying an entity in the content. In such examples, the entity can be predefined to be associated with an intent. At step 350, the process 300 further includes determining an intent of the content based on the comparison. In some examples, the determining can be further based on the entity.

At step 360, the process 300 further includes sending a response for the HTTP post call message based on the determined intent of the content. For example, the bot server can generate a response based on user code included in an intent object. The user code can define how to respond to a message associated with an intent associated with the intent object.

In some examples, the process 300 can further include receiving a package. In such examples, the package can define one or more intents. In some examples, an intent of the one or more intents can include one or more entities. In some examples, the package can be associated with a domain, the domain including the one or more intents.

C. Dialog Engine

As described above, a message processor pipeline can include a dialog engine. The dialog engine can orchestrate a conversation with a bot server. In some examples, the dialog engine can be a declarative way to build a system for responding to a message.

The dialog engine can receive an identification of an intent from a natural language processor. Using the identification of the intent, the dialog engine can access an intent object associated with the intent. The intent object can include one or more entities that are associated with the intent. In some examples, each entity of the one or more entities can be assigned a priority. In such examples, at least a portion of the one or more entities can be required entities.

A required entity can be an entity that the dialog engine requires before the dialog engine can end a conversation with a user.

For example, a pizza application can require a size and a type of a pizza. In such an example, the dialog engine can identify whether a current message received by the user in the current conversation includes a size and a type of a pizza. If the current message received by the user does not include the size and the type of a pizza, the dialog engine can determine whether a previous message includes at least one or more of the size and the type of a pizza. If the dialog engine determines that it has not received the size and/or the type of a pizza, the dialog engine can generate a response to the current message that requests for the missing required entity. In some examples, if there are multiple missing required entities, the dialog engine can generate a response for a first of the missing required entities, and then later generate a message for a second of the missing required entities. The process can continue until the dialog engine has received all of the required entities.

In some examples, the dialog engine can identify portions of a conversation with one or more users that result in a termination of the conversation. The dialog engine can then improve the conversation for future users based on the identified portions of the conversation that indicate a turning point of the conversation. In some examples, the dialog engine can identify a conversation that appears to be about to be terminated (e.g., bad sentiment is determined in the conversation). In such an example, the dialog system can change the flow of the conversation, possibly redirecting the conversation to a different system or even a human.

Figure 4:
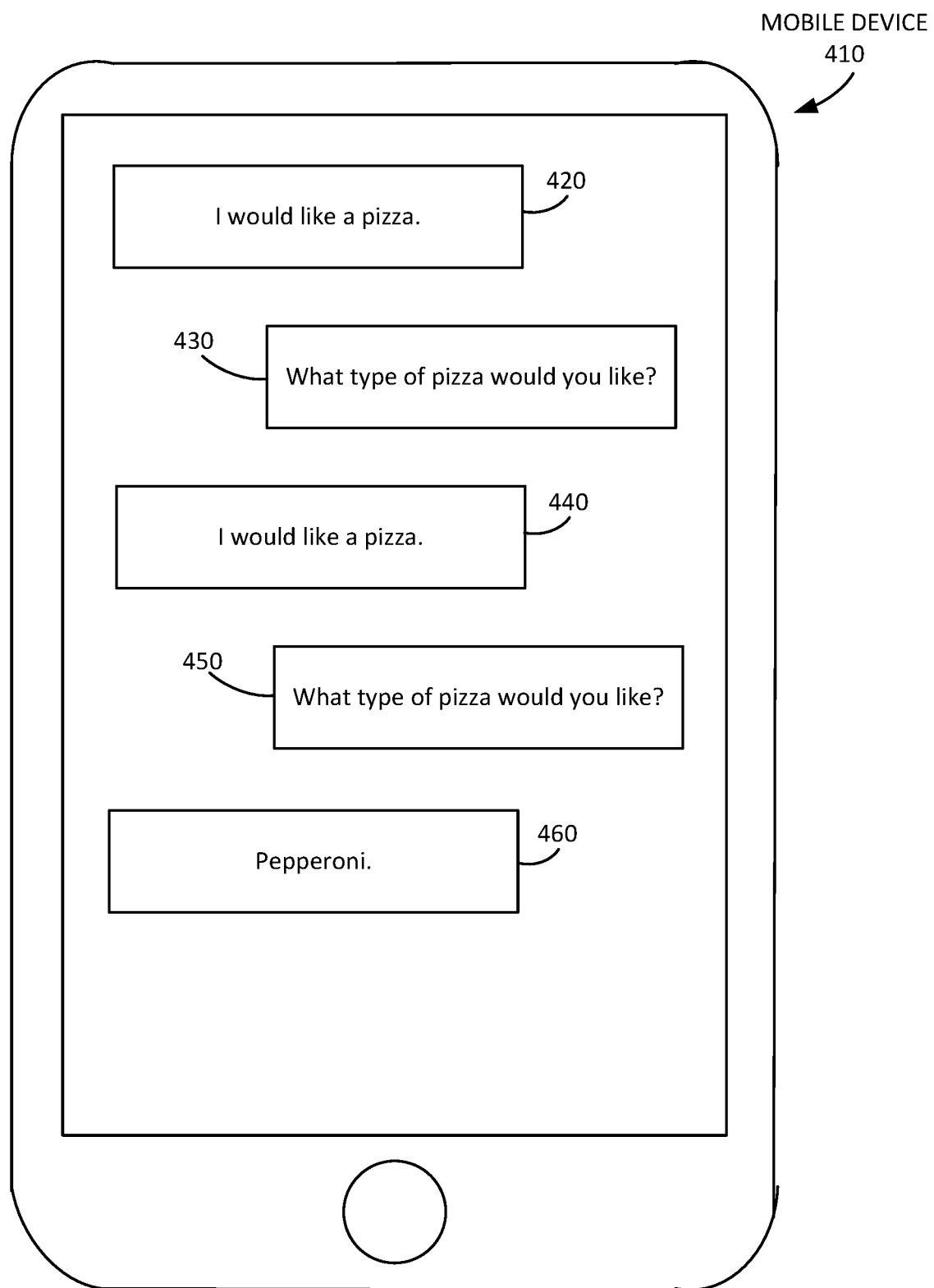
FIG. 4 illustrates an example of a conversation between a user on a mobile device and a bot server using a messaging application.

FIG. 4 illustrates an example of a conversation between a user on a mobile device 410 and a bot server using a messaging application. The messages on the left (e.g., messages 420, 440, 460) can be from the user, and messages on the right (e.g., messages 430, 450) can be from the bot server. For example, the user can send the first message 420 to the messaging application system using a messaging application installed on the mobile device 410. The first message 420 can include the words "I would like a pizza." The first message can be sent to a messaging application server, and then to the bot server for a response.

As mentioned above, the first message 420 can arrive at a connector or a load-balancer, depending on a setup of the bot server. The first message 420 can be put into a message-in queue and, eventually, sent to a messenger processor pipeline. In the messenger processor pipeline, the first message 420 can be interpreted by a natural language processor. The natural language processor can identify an intent for the first message 420. For example, the natural language processor can identify that the first message 420 is trying to order a pizza. The intent can be sent to a dialog engine. The dialog engine can identify one or more required entities for the intent. For example, a required entity can be a type of pizza. The dialog engine can determine whether the message (or a previous message) has indicated a type of pizza for the user. Upon determining that the type of pizza has not been specified, the dialog engine can send an indication to bot code that the type of pizza is missing. In some examples, the first message 420 can also be sent to the bot code to determine a response.

Because the dialog engine is missing the type of pizza, the bot code can generate a response to request the type of pizza. The response can include the words in the second message 430: "What type of pizza would you like?" The second message 430 can be sent from the bot code to a message-out queue and, eventually, sent to the connector to be sent back to the messaging application installed on the mobile device 410 using the messaging application server. The messaging application installed on the mobile device 410 can receive the second message 430 and display the second message 430 as shown in FIG. 4.

After receiving the second message 430, the user can send the third message 440 to the bot server using the messaging application on the mobile device 410. The third message 440 can include the words "I would like a pizza." The bot server can determine that the third message 440 is a new session based on the content of the third message and the context of the third message. For example, time could have elapsed from the user receiving the second message 430 and the user sending the third message 440.

The natural language processor can identify an intent for the third message 440. For example, the natural language processor can identify that the third message 440 is trying to order a pizza. The intent can be sent to the dialog engine. The dialog engine can identify one or more required entities for the intent. For example, a required entity can be a type of pizza. The dialog engine can determine whether the message (or a previous message) has indicated a type of pizza for the user for the current session. Upon determining that the type of pizza has not been specified, the dialog engine can send an indication to bot code that the type of pizza is missing. In some examples, the third message 440 can also be sent to the bot code to determine a response. The bot server can respond to the third message 440 similarly to the first message 420 (e.g., by sending the fourth message 450 asking what kind of pizza the user would like).

The user can respond to the fourth message 450 with the fifth message 460, which includes a type of pizza the user would like. The bot server can receive the fifth message 460 as described above. However, rather than creating a new session for the fifth message 460, the bot server can determine that the fifth message 460 is a part of a conversation that includes the third message 440 and the fourth message 450. By the bot server grouping the three messages together, the bot code of the bot server can determine how to respond to the fifth message 460 by analyzing the third, fourth, and fifth messages together. In some examples, the intent can include one required entity (e.g., a type of pizza). In such examples, after the type of pizza is indicated, the bot server can end a conversation with the user.

FIG. 5 is a flowchart illustrating an example of a process for sending a response to request additional information from a user. In some aspects, the process 500 can be performed by a bot server. While specific examples might be given of the bot server, it should be recognized that other devices can be included in the process 500.

Process 500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 510, the process 500 includes receiving, by a bot server associated with a uniform resource identifier (URI), a hypertext transfer protocol (HTTP) post call message. In some examples, the HTTP post call message can be directed to the URI from a messaging application server. In such examples, the HTTP post call message can include content (e.g., text, emojis, audio, image, video, or other method of conveying a message) from a user. In other examples, the content can be received by the bot server in a message other than a HTTP post call message (e.g., a packet sent from a remote server). In some examples, the content can include a plurality of words.

At step 520, the process 500 further includes identifying an intent of the content. The intent of the content can be identified as described above. At step 530, the process 500 further includes identifying one or more required entities associated with the identified intent. In some examples, the identified intent can be associated with an intent object. The intent object can include one or more entities. Each of the one or more entities can include a priority. The priority can indicate one or more required entities of the one or more entities. At step 540, the process 500 further includes identifying a required entity of the one or more required entities that is missing from the content.

At step 550, the process 500 further includes generating a response for the HTTP post call message. In some examples, the response can request the missing required entity. At step 560, the process 500 further includes sending the response for the HTTP post call message to the messaging application server.

D. Event Data

1. System for Managing Event Data

Event data associated with a web page, a mobile application, or the like can be sent to a storage server to be stored. Event data can describe one or more actions performed in relation to the web page and/or the mobile application. For example, event data can include a message received by a bot server, as described above. Event data can also include a response to the message. In some examples, the event data can be raw data that has not been processed for use. A queue of the storage server can receive the event data. The queue can be similar to as described above with the message-in queue. In some examples, the event data can be received by the queue in a streaming manner as the events associated with the event data occur.

A first executing process (e.g., a spark executor) can pull the event data from the queue and store it in a local database. The local database can be included in the storage server. The local database can have a schema that is partitioned by a period of time. For example, the local database can be partitioned by day. Partitioning by day can mean that incoming event data can be put into a partition (or location (e.g., a file) in the local database). The partition can be deleted every day such that the local database only maintains a certain amount of data.

The first executing process can perform one or more enriching operations on the event data before storing in the local database. Enriching the event data can include enhancing, refining, or otherwise improving the event data. For example, enriching can correct misspellings or typographical errors.

The first executing process can send the enriched data back to the queue. In other examples, the first executing process can send the enriched data to a second queue, which can be similar to the first queue. A second executing process can pull the enriched data from the queue (or the second queue) and store it in a remote file system. The remote file system can be separate from the storage server.

The remote file system can write the enriched data into a database (e.g., one or more hive tables). The one or more hive tables can be materialized in the remote file system as one or more external tables. The one or more external tables can be unioned with the local database to create a virtual database such that the virtual database includes all of the event data received by the storage server.

When the virtual database is queried, the one or more external tables and/or the local database can be accessed to receive the event data. In some examples, the virtual database can determine where to query. In such examples, the virtual database can break a query into two or more queries when data that is requested is included in separate databases. In some examples, the virtual database can make it appear to a user querying the virtual database that the one or more external tables and the local database are one database. In some examples, the virtual database can be defined in the local database.

Figure 6:
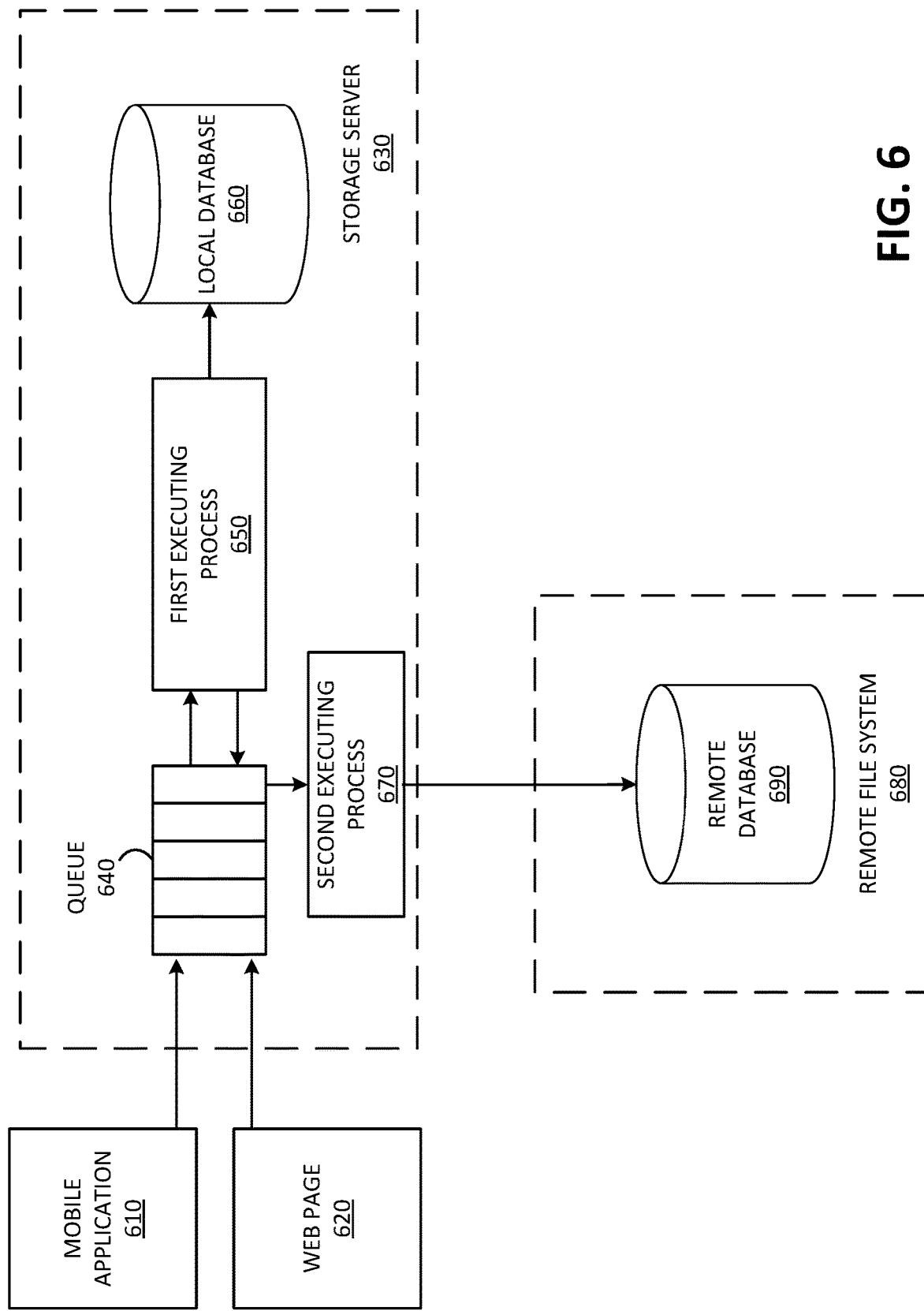
FIG. 6 illustrates an example of a system for managing event data.

FIG. 6 illustrates an example of a system for managing event data. The system can include a storage server 630 and a remote file system 680. The storage server 630 can include a queue 640. The queue 640 can receive event data from one or more of a mobile application 610 and/or a web page 620. It should be recognized that the event data can be from other sources.

The storage server 630 can further include a first executing process 650. The first executing process 650 can pull event data from the queue 640 to store in a local database 660. In some examples, the first executing process 650 can enrich the event data that is pulled from the queue 640 before the event data is stored in the local database 660. In such examples, the enriched data can be stored in the local database 660. In some examples, after enriching the event data, the first executing process 650 can send the enriched data to the queue 640. In other examples, after enriching the event data, the first executing process 650 can send the enriched data to a second queue (not illustrated).

The local database 660 can include one or more partitions. Each partition can be used to store data according to a characteristic. For example, a first partition can store event data from a first user. In such an example, a second partition can store event data from a second user. In addition, the local database 660 can be partitioned by a time period. In such an example, the local database 660 can delete event data included in the local database 660 based on a schedule. For example, the local database 660 can delete the event data every day.

In some examples, the storage server 630 can further include a second executing process 670. The second executing process 670 can pull enriched event data (or just event data) from the queue 640 (or the second queue) to store in the remote file system 680.

The remote file system 680 can be separate from the storage server 630. The remote file system 680 can include a remote database 690 to have the event data stored into.

Figure 7:
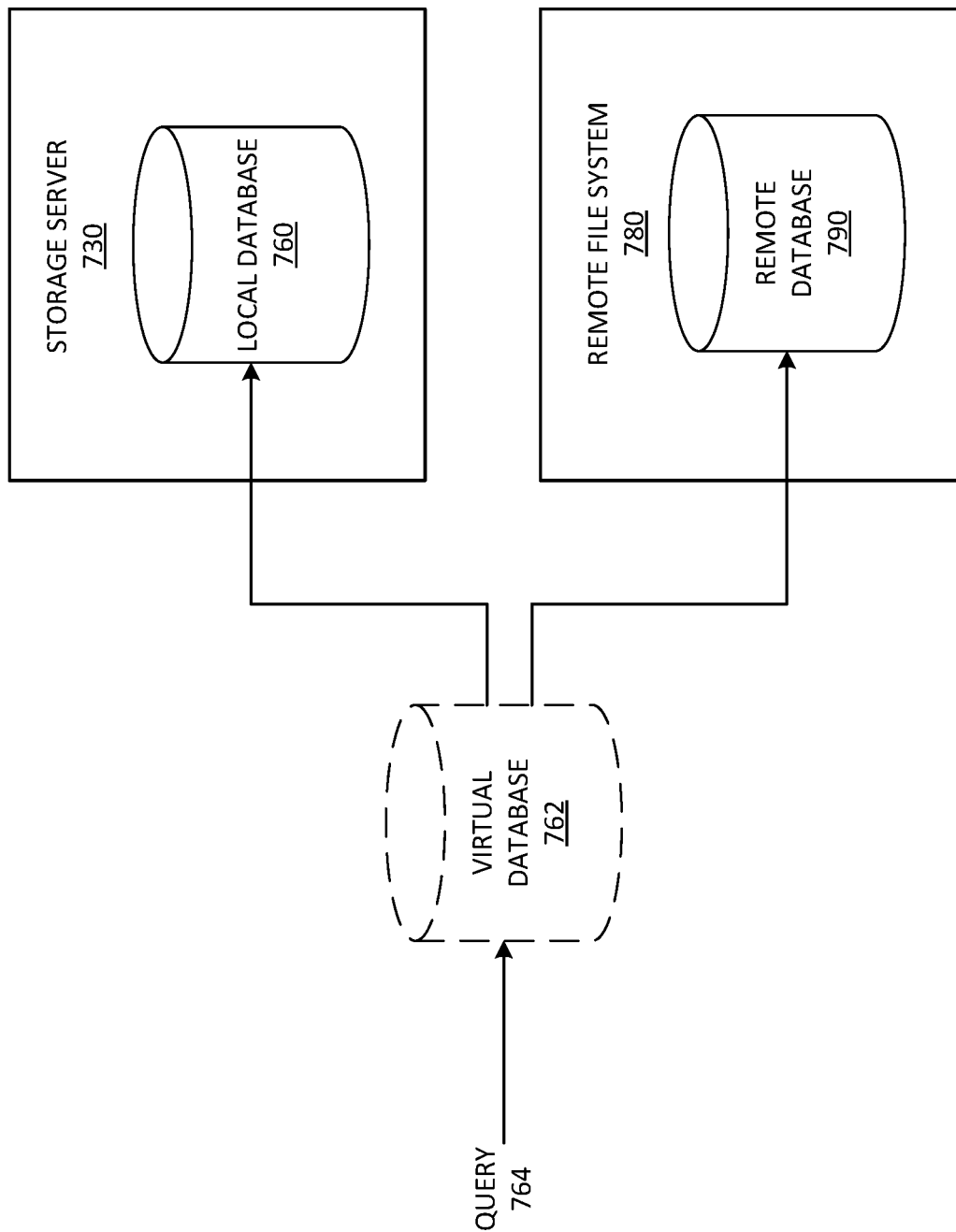
FIG. 7 illustrates an example of a virtual database.

FIG. 7 illustrates an example of a virtual database 762. The virtual database 762 can act as an interface for a local database 760 (similar to the local database 660) and a remote database (similar to the remote database 690). The virtual database 762 can expose an application program interface to receive a query (e.g., a query 764) from a user for accessing the virtual database 762. The query 764 can be called as if the data is on the virtual database 762. In some examples, the virtual database 762 can identify a location of the data requested by the query 764, and create one or more queries for the data from the local database 760 and/or the remote database 790. In such examples, the virtual database 762 can receive the data from the local database 760 and/or the remote database 790, and respond to the query 764 with the data.

2. Materialized View

In some examples, the storage server describe above can be included in a Customer Insights & Engagement Cloud Service (CIECS). The CIECS can analyze information stored in the storage server. In some examples, the CIECS can perform behavioral analytics for a source (e.g., a web page and/or a mobile application). In such examples, the behavioral analytics can analyze interactions with the source, including engagement (e.g., an activity level of a user), cohort analysis (e.g., retention of a user), and churn prediction (e.g., identifying user's that are at risk of not returning). In some examples, the CIECS can conduct a/b testing (e.g., testing different layouts with different users), user/session analytics (e.g., identifying information associated with a session for a user), and predictive analytics (e.g., based on a sample, identifying an inference that can be associated with all of the data).

In some examples, analytics performed on event data can be calculated using a query with a fixed time. In such examples, the query itself might not change because the query is requesting data from a period of time prior to the current time. However, the data returned from the query can change. For example, a query for data from one hour prior can return different data depending on when the query is executed.

To optimize queries for a fixed time, a materialized view can be created in front of a database (e.g., in front of the local database 660 described in FIG. 6). The materialized view can include one or more summary calculations that describe the event data received by the storage server. In such examples, when new event data is received, and the new event data is added to a database, a summary calculation can be incrementally updated such that prior event data does not need to be accessed. Instead, one or more summary values used for the summary calculation, or the summary calculation itself, can be saved, and incrementally updated when new event data is received. In such examples, event data is not saved for the summary calculation.

For example, a summary calculation can be a number of daily new users. Rather than having to query event data from the current day, a summary value indicating the number of daily new users can be saved by the materialized view. The summary value can be incremented as new event data indicates a new user.

In some examples, the one or more summary calculations of the materialized view can be updated according to a schedule. For example, rather than updating a summary calculation as new event data is received, the summary calculation can be updated every hour. An example of a summary calculation that can benefit from updating according to a schedule is funnel recognition. A funnel can occur when a plurality of required actions occur in sequence, each action occurring within an amount of time since the previous action. For example, the funnel can require a user to select an item and buy the item. In such an example, the funnel would only be identified when both actions occur together, within a particular amount of time. In such an example, a query to determine whether a funnel occurred can include a search for a number of events by a single user. The events then would need to be assessed as a collection of events, rather than individual events.

Figure 8:
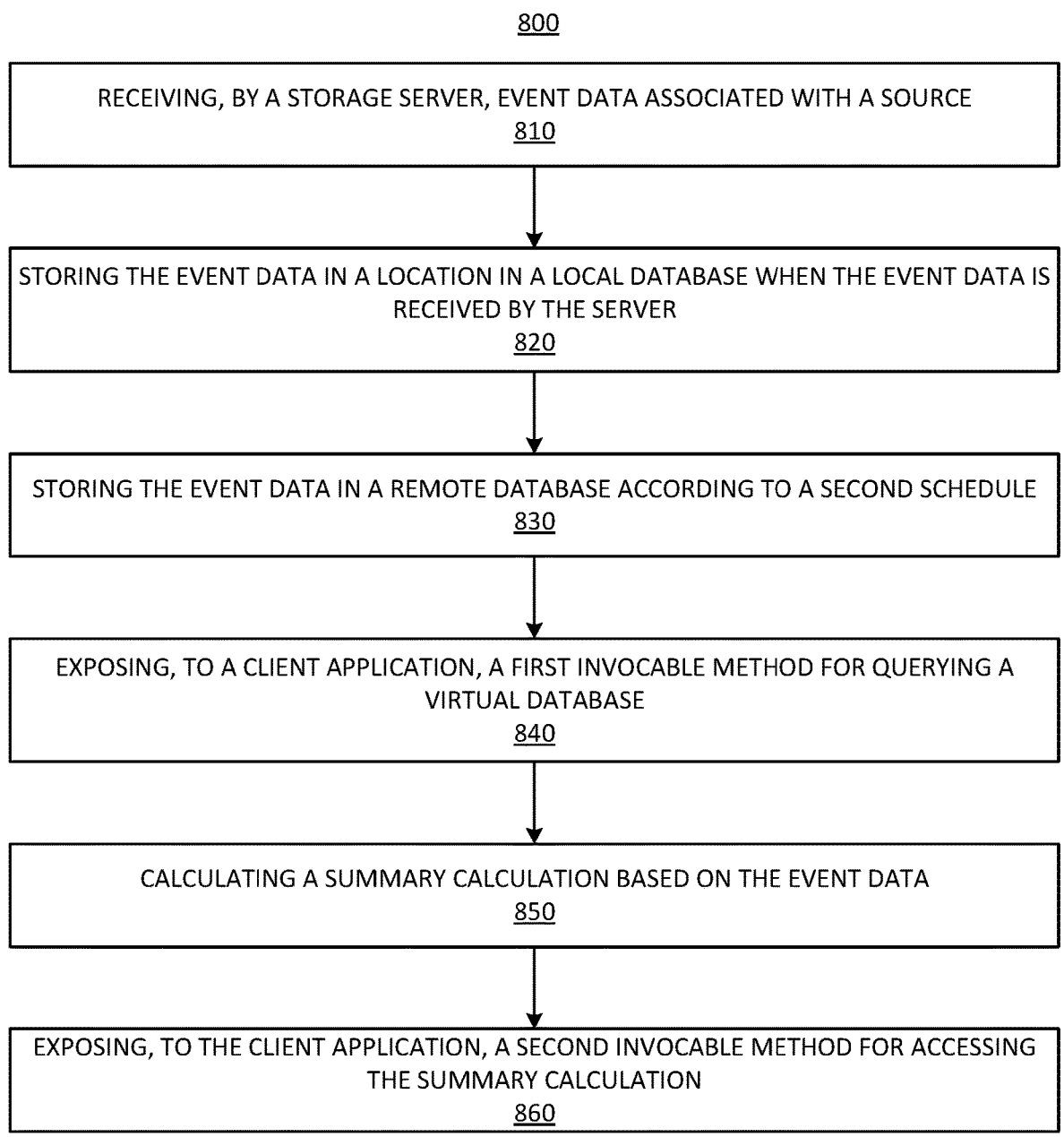
FIG. 8 is a flowchart illustrating an example of a process for exposing an invocable method for accessing a virtual database.

FIG. 8 is a flowchart illustrating an example of a process for exposing an invocable method for accessing a virtual database. In some aspects, the process 800 can be performed by a storage server. While specific examples might be given of the storage server, it should be recognized that other devices can be included in the process 800.

Process 800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 810, the process 800 includes receiving, by a storage server, event data associated with a source. In some examples, the source can be a mobile application or a web page. In such examples, the event data can describe one or more actions related to the source.

At step 820, the process 800 further includes storing the event data in a location in a local database when the event data is received by the storage server. In some examples, the storage server can include the local database. In such examples, data in the location is deleted according to a first schedule. An example of the first schedule can be daily.

At step 830, the process 800 further includes storing the event data in a remote database according to a second schedule. The event data can be stored in the remote database after the event data is stored in the local database. In some examples, the remote database can be separate from the storage server. In such examples, the first schedule can be less often than the second schedule. An example of the second schedule can be hourly. In some examples, a remote file system can include the remote database.

At step 840, the process 800 further includes exposing, to a client application, a first invocable method for querying a virtual database. In some examples, a query for the event data using the first invocable method can retrieve the event data from the local database when the event data is in the local database. In such examples, the query can retrieve the event data from the remote database after the event data is deleted from the local database.

At step 850, the process 800 further includes calculating a summary calculation based on the event data. In some examples, the summary calculation can be incrementally updated when event data is received by the storage server. In such examples, the summary calculation can be incrementally updated without having to query a database for event data. In other examples, the summary calculation can be incrementally updated according to a third schedule. For an example, the third schedule can be hourly. The summary calculation can be based on data that is currently stored in the local database and data that is currently stored in the remote database. The summary calculation can be based on data from a period of time prior to the current time.

Figure 9:
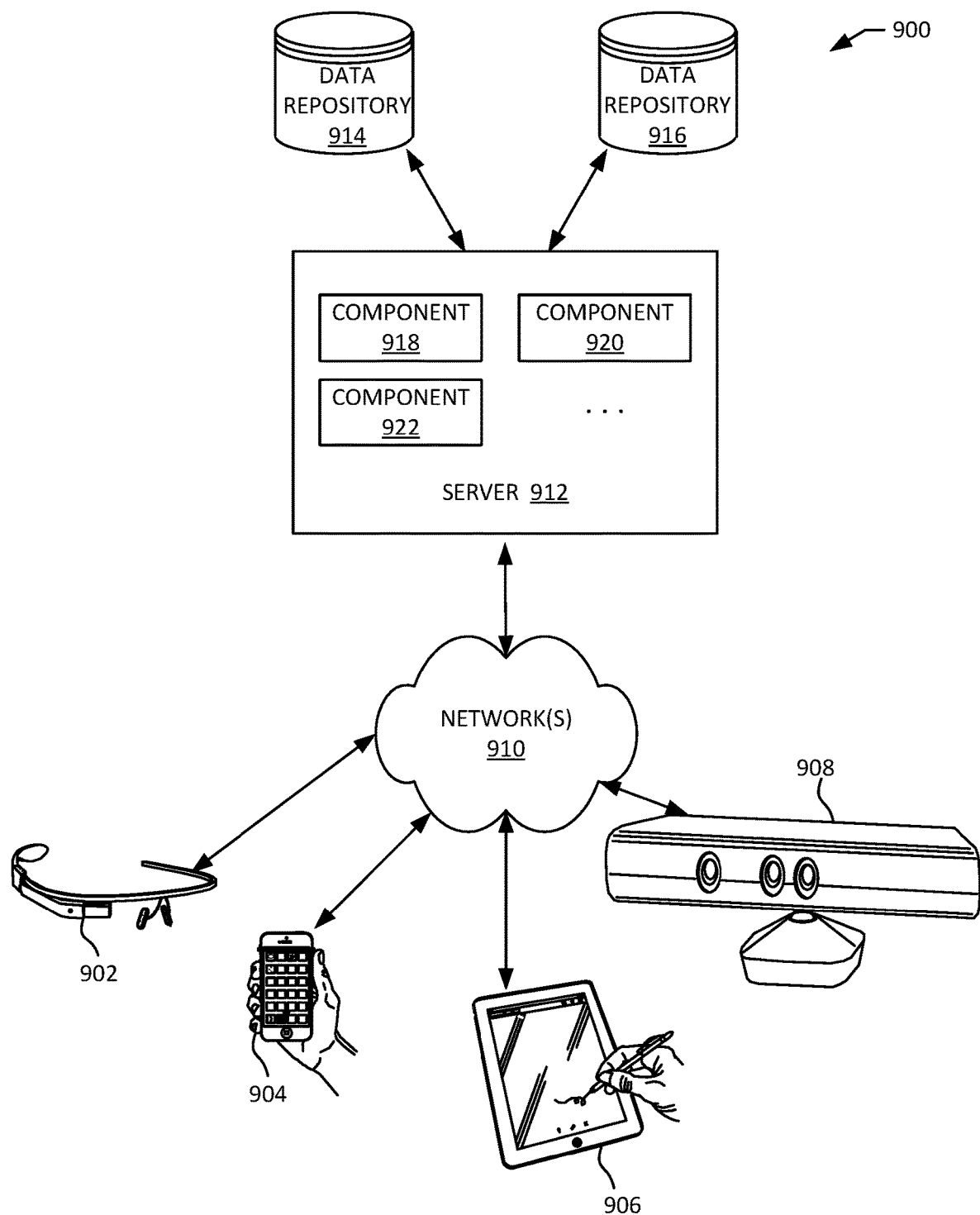
FIG. 9 illustrates an example of a server.

FIG. 9 illustrates an example of server 912. Server 912 includes component 918, 920, 922. Server 912 is communicating with reference number 902, 904, 906, 908. Server 912 is also communicating with data repository 914 and data repository 916.

Figure 10:
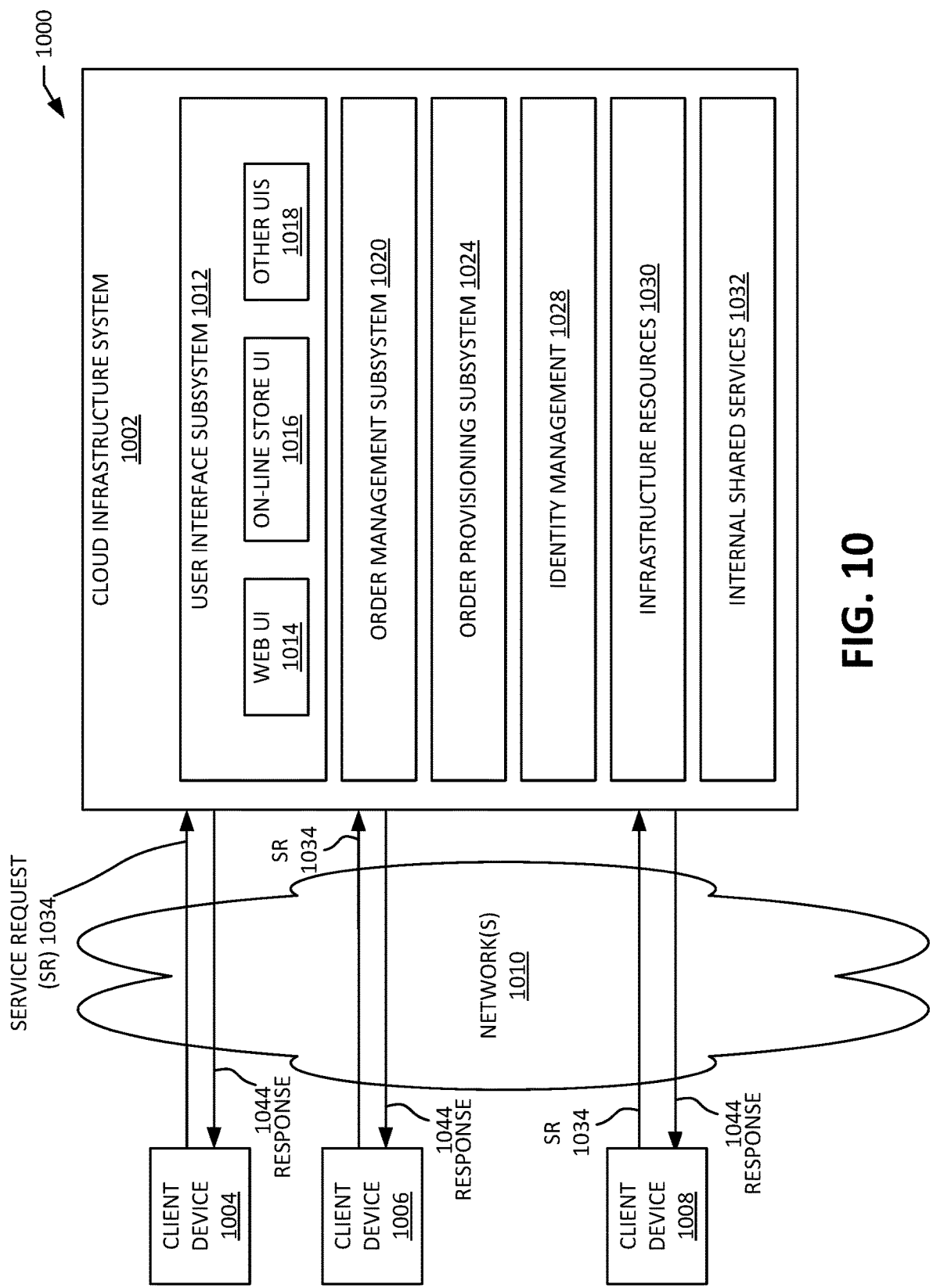
FIG. 10 illustrates an example of a cloud infrastructure system.

FIG. 10 illustrates an example of cloud infrastructure system 1002. Cloud infrastructure system includes user interface subsystem 1012, order management subsystem 1020, order provisioning subsystem 1024, identity management 1028, infrastructure resources 1030, and internal shared services 1032. User interface subsystem 1012 includes web UI 1014, on-line store UI 1016, and other UIS 1018. Client device 1004 sends a service request (SR) 1034 to cloud infrastructure system 1002 through network(s) 1010. Cloud infrastructure system 1002 sends response 1044 to client device 1004. Client device 1006 sends a SR 1034 to cloud infrastructure system 1002 through network(s) 1010. Cloud infrastructure system 1002 sends response 1044 to client device 1006. Client device 1008 sends a SR 1034 to cloud infrastructure system 1002 through network(s) 1010. Cloud infrastructure system 1002 sends response 1044 to client device 1008.

Figure 11:
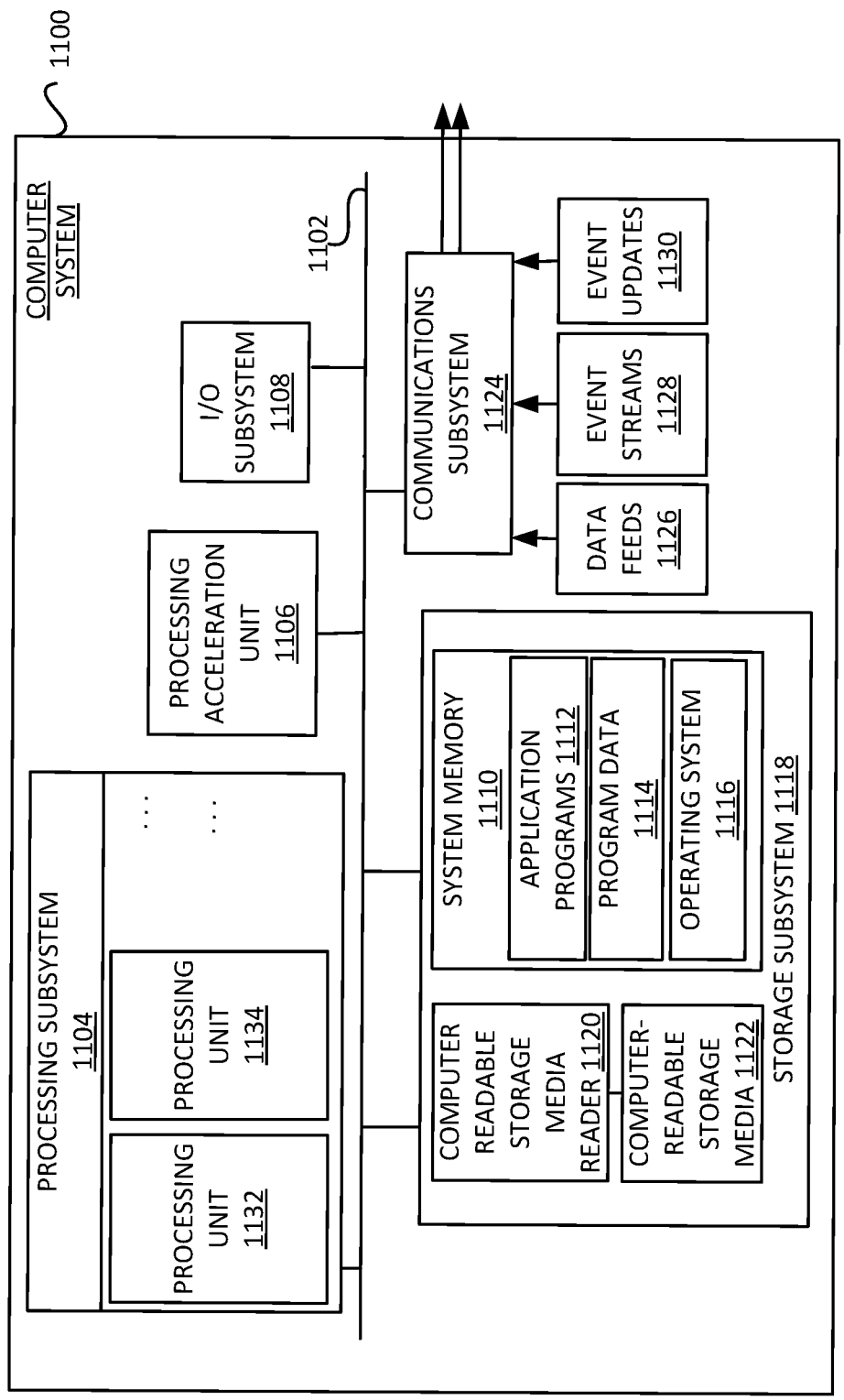
FIG. 11 illustrates an example of a computer system.

FIG. 11 illustrates an example of computer system 1100. Computer system 1100 includes processing subsystem 1104, processing acceleration unit 1106, I/O subsystem 1108, storage subsystem 1118, communications subsystem 1124, data feeds 1126, event streams 1128, and event updates 1130. Processing subsystem 1104 includes processing unit 1132 and processing unit 1134. Storage subsystem 1118 includes system memory 1110, computer readable storage media reader 1120, and computer-readable storage media 1122. System memory 1110 includes application programs 1112, program data 1114, and operating system 1116. Communications subsystem 1124 communicates outside of computer system 1100. Communications subsystem 1124 also communicates with data feeds 1126, event streams 1128, and event updates 1130. Communications subsystem 1124 also communicates with processing subsystem 1104, processing acceleration unit 1106, I/O subsystem 1108, and storage subsystem 1118. Processing subsystem 1104, processing acceleration unit 1106, I/O subsystem 1108, and storage subsystem 1118, and communications subsystem 1124 each communicate with each other.

In the foregoing specification, aspects of this disclosure are described with reference to specific examples thereof, but those skilled in the art will recognize that this disclosure is not limited thereto. Various features and aspects of the above-described examples may be used individually or jointly. Further, examples can be utilized in any number of environments and applications beyond those described herein without departing from the broader spirit and scope of the specification. The specification and drawings are, accordingly, to be regarded as illustrative rather than restrictive.

For the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:
    receiving, by a server with a uniform resource identifier (URI) from a source, a hypertext transfer protocol (HTTP) post call message directed to the URI and comprising event data including a message from a user;
    storing the event data in a location in a local database, wherein the server includes the local database, and wherein
    the event data is deleted from the location according to a first schedule;
    after storing the event data in the location, storing the event data in a remote database according to a second schedule, wherein the remote database is separate from the server, and wherein the first schedule is less often than the second schedule;
    defining a virtual database comprising a union of the local database and the remote database;
    exposing, to a client application, an application programming interface to receive a query from a user for accessing the virtual database, wherein receiving the query invokes a first invocable method for querying the virtual database;
    calculating, by the server, a first summary value from the event data of the source, the first summary value quantifying particular actions performed at the source by one or more users, the first summary value being used to generate a materialized view of analytics associated with the source;
    incrementally updating, by the server, the first summary value as new event data is received, the first summary value being updated independent from accessing the event data of the local database and the remote database;
    calculating, by the server, a second summary value based at least in part on identifying that a particular action has taken place with respect to a particular user based at least in part on identifying, from a plurality of individual events including the event data received by the server and one or more instances of event data retrieved from the virtual database, that a plurality of required actions associated with the particular action have occurred in accordance with a predefined sequence and within a predefined amount of time of one another; and
    exposing, to the client application, a second invocable method for accessing the first summary value and the second summary value.

2. The method of claim 1, wherein the source is a mobile application or a web page.

3. The method of claim 1, wherein the first summary value is incrementally updated by the server having the URI on receipt of the HTTP post call message without having to query a database.

4. The method of claim 1, wherein the first summary value is incrementally updated according to a third schedule, and wherein the first schedule is less often than the third schedule.

5. The method of claim 1, wherein the first summary value is based on data that is currently stored in the local database and data that is currently stored in the remote database.

6. The method of claim 1, wherein the first summary value is based on data from a period of time corresponding to a partition of the local database, the period of time occurring prior to a current time.

7. A system comprising:
    one or more processors; and
    a non-transitory computer-readable medium containing instructions that, when executed by the one or more processors, cause the one or more processors to perform operations including:
    receive, by a server with a uniform resource identifier (URI) from a source, a hypertext transfer protocol (HTTP) post call message directed to the URI and comprising event data including a message from a user;
    store the event data in a location in a local database, wherein the system includes the local database, and wherein
    the event data is deleted from the location according to a first schedule;
    after storing the event data in the location, store the event data in a remote database according to a second schedule, wherein the remote database is separate from the system, and wherein the first schedule is less often than the second schedule;
    define a virtual database comprising a union of the local database and the remote database;
    expose, to a client application, an application programming interface to receive a query from a user for accessing the virtual database, wherein receiving the query invokes a first invocable method for querying the virtual database;
    calculate a first summary value from the event data of the source, the first summary value quantifying particular actions performed at the source by one or more users, the first summary value being used to generate a materialized view of analytics associated with the source; and
    incrementally update, by the server, the first summary value as new event data is received, the first summary value being updated independent from accessing the event data of the local database and the remote database;

calculate, by the server, a second summary value based at least in part on identifying that a particular action has taken place with respect to a particular user based at least in part on identifying, from a plurality of individual events including the event data received by the server and one or more instances of event data retrieved from the virtual database, that a plurality of required actions associated with the particular action have occurred in accordance with a predefined sequence and within a predefined amount of time of one another;

expose, to the client application, a second invocable method for accessing the first summary value and the second summary value.

8. The system of claim 7, wherein the source is a mobile application or a web page.

9. The system of claim 7, wherein the first summary value is incrementally updated by the server having the URI on receipt of the HTTP post call message without having to query a database.

10. The system of claim 7, wherein the first summary value is incrementally updated according to a third schedule, and wherein the first schedule is less often than the third schedule.

11. The system of claim 7, wherein the first summary value is based on data that is currently stored in the local database and data that is currently stored in the remote database.

12. The system of claim 7, wherein the first summary value is based on data from a period of time corresponding to a partition of the local database, the period of time occurring prior to a current time.

13. A computer-program product tangibly embodied in a non-transitory machine-readable storage medium, including instructions that, when executed by one or more processors, cause the one or more processors to:

receive, by a server associated with a uniform resource identifier (URI) from a source, a hypertext transfer protocol (HTTP) post call message directed to the URI and comprising event data including a message from a user;

store the event data in a location in a local database, wherein the server includes the local database, and wherein the event data is deleted from the location according to a first schedule;

after storing the event data in the location, store the event data in a remote database according to a second schedule, wherein the remote database is separate from the server, and wherein the first schedule is less often than the second schedule;

define a virtual database comprising a union of the local database and the remote database;

expose, to a client application, an application programming interface to receive a query from a user for accessing the virtual database, wherein receiving the query invokes a first invocable method for querying the virtual database;

calculate, by the server, a summary value from the event data of the source, a first summary value quantifying particular actions performed at the source by one or more users, the first summary value being used to generate a materialized view of analytics associated with the source;

incrementally update the first summary value as new event data is received, the first summary value being updated independent from accessing the event data of the local database and the remote database;

calculate, by the server, a second summary value based at least in part on identifying that a particular action has taken place with respect to a particular user based at least in part on identifying, from a plurality of individual events including the event data received by the server and one or more instances of event data retrieved from the virtual database, that a plurality of required actions associated with the particular action have occurred in accordance with a predefined sequence and within a predefined amount of time of one another; and expose, to the client application, a second invocable method for accessing the first summary value and the second summary value.

14. The computer-program product of claim 13, wherein the source is a mobile application or a web page.

15. The computer-program product of claim 13, wherein the first summary value is incrementally updated by the server upon receipt of the HTTP post call message without having to query a database.

16. The computer-program product of claim 13, wherein the first summary value is incrementally updated according to a third schedule, and wherein the first schedule is less often than the third schedule.

17. The computer-program product of claim 13, wherein the first summary value is based on data that is currently stored in the local database and data that is currently stored in the remote database.

* * * * *